(12) United States Patent
Abdulla et al.

(10) Patent No.: US 8,996,822 B2
(45) Date of Patent: Mar. 31, 2015

(54) MULTI-DEVICE MEMORY SERIAL ARCHITECTURE

(75) Inventors: Mostafa Naguib Abdulla, Rancho Cordova, CA (US); August Camber, Rocklin, CA (US)

(73) Assignee: Micron Technology, Inc., Boise, ID (US)

( * ) Notice: Subject to any disclaimer, the term of this patent is extended or adjusted under 35 U.S.C. 154(b) by 852 days.

(21) Appl. No.: 13/194,859

(22) Filed: Jul. 29, 2011

(65) Prior Publication Data

US 2013/0031315 A1 Jan. 31, 2013

(51) Int. Cl.
G06F 12/00 (2006.01)
G06F 13/00 (2006.01)
G06F 13/28 (2006.01)
G06F 13/16 (2006.01)

(52) U.S. Cl.
CPC ..................... *G06F 13/16* (2013.01)
USPC ................ 711/149; 711/4; 711/105; 711/112

(58) Field of Classification Search
None
See application file for complete search history.

(56) References Cited

U.S. PATENT DOCUMENTS

| | | | | |
|---|---|---|---|---|
| 6,034,878 A * | 3/2000 | Osaka et al. | ...................... | 365/52 |
| 6,173,382 B1 * | 1/2001 | Dell et al. | ...................... | 711/170 |
| 6,530,033 B1 * | 3/2003 | Raynham et al. | ............... | 714/5.1 |
| 7,788,451 B2 | 8/2010 | Larson et al. | | |
| 2004/0034753 A1 | 2/2004 | Jeddeloh | | |
| 2005/0044304 A1 | 2/2005 | James | | |
| 2007/0136537 A1 * | 6/2007 | Doblar et al. | .................. | 711/154 |
| 2008/0205140 A1 * | 8/2008 | Lee et al. | .................. | 365/185.03 |
| 2008/0215792 A1 * | 9/2008 | Jeddeloh | ........................ | 710/317 |
| 2008/0256281 A1 * | 10/2008 | Fahr et al. | ...................... | 710/305 |
| 2009/0083460 A1 * | 3/2009 | Mitra et al. | .................... | 710/104 |
| 2009/0119466 A1 | 5/2009 | Gower et al. | | |
| 2009/0300260 A1 * | 12/2009 | Woo et al. | ...................... | 710/316 |
| 2009/0319703 A1 | 12/2009 | Chung | | |
| 2010/0005218 A1 | 1/2010 | Gower et al. | | |
| 2010/0005219 A1 | 1/2010 | Loughner et al. | | |
| 2010/0036994 A1 * | 2/2010 | Resnick | ........................ | 710/316 |
| 2010/0091541 A1 | 4/2010 | Park et al. | | |
| 2010/0115217 A1 | 5/2010 | Oh et al. | | |
| 2010/0191894 A1 | 7/2010 | Bartley et al. | | |
| 2011/0040909 A1 | 2/2011 | Abdulla | | |
| 2011/0044085 A1 | 2/2011 | Hinchris | | |
| 2011/0161576 A1 * | 6/2011 | Kim et al. | ...................... | 711/105 |

OTHER PUBLICATIONS

PCT Search Report and Written Opinion, PCT/US2012/048018, dated Dec. 26, 2012.
Marinissen, et al, "A Structured and Scalable Mechanism for Test Access to Embedded Reusable Cores," IEEE, http://ieeexplore.ieee.org/xpl/freeabs_all.jsp:arnuber=743166, Test Conference, 1998, Washington DC, 1 page.

* cited by examiner

*Primary Examiner* — Yaima Rigol
(74) *Attorney, Agent, or Firm* — Knobbe Martens Olson & Bear LLP (57) ABSTRACT

Subject matter disclosed herein relates to memory devices comprising a memory array, a first port to interface with a memory controller directly or indirectly via another memory device, a second port to interface with yet another memory device, and a switch to selectively electrically connect the memory controller to a circuit path leading to the second port or to the memory array, wherein the switch may be responsive to a signal generated by the memory controller.

13 Claims, 5 Drawing Sheets

MULTI-DEVICE MEMORY SERIAL ARCHITECTURE

BACKGROUND

1. Field

Subject matter disclosed herein relates to memory architecture or memory operations, such as writing to or reading from memory.

2. Information

Memory devices may be employed in various electronic devices, such as computers, cell phones, personal digital assistants (PDA's), data loggers, or navigational equipment, just to name a few examples. For example, various types of volatile or nonvolatile memory devices may be employed, such as dynamic random access memory (DRAM), NAND flash memory, NOR flash memory, or phase-change memory (PCM), just to name a few examples.

Arranging multiple memory dies in a package or connecting multiple memory devices in parallel has become a viable approach to increasing memory capacity or perhaps memory system density. Unfortunately, as the number of devices increases, physical or electrical effects may result in undesirable memory system characteristics, such as increased capacitive load, reduced bandwidth, or reduced operating speed, for example.

DETAILED DESCRIPTION

Reference throughout this specification to "one embodiment" or "an embodiment" means that a particular feature, structure, or characteristic described in connection with an embodiment is included in at least one embodiment of claimed subject matter. Thus, appearances of phrases such as "in one embodiment" or "an embodiment" in various places throughout this specification are not necessarily all referring to the same embodiment. Furthermore, particular features, structures, or characteristics may be combined in one or more embodiments.

In some memory systems, arranging multiple memory devices together, such as in a stacked or parallel configuration, for example, may result in reduced operating speed or other performance degradation. In particular, multiple memory devices sharing a bus may individually contribute to a combined bus capacitance that may be detrimental to performance of a memory system comprising multiple memory devices. For example, a combined bus capacitance resulting from twenty parallel memory devices may be about 100.0 picoFarads. A capacitance of this magnitude may result in a measurable impact on performance. Accordingly, embodiments described involve techniques to interconnect multiple memory devices so that a capacitive load connecting a memory controller to the memory devices may be relatively small (e.g., about 4.0 picoFarads). In the examples provided of 4 pF versus 100 pF, this may result in two and a half orders of magnitude of difference. For example, a memory controller may select or access a particular memory device while the memory controller bypasses other memory devices. A benefit in using techniques, such as examples described herein, may include that latencies associated with read, write, or erase operations to access memory devices of a memory system may be relatively low. Also, a benefit in using techniques, such as examples described herein, may include involve a relatively low number of pins or conducting lines.

In one implementation, multiple memory devices may be interconnected in a chain topology, as described in detail below, using a serial bidirectional point-to-point connection. Throughout this document, the terms "connection" and "interconnection" are used interchangeably. Although claimed subject matter is not limited in scope in this respect, in an embodiment described herein, connections are characterized at a physical level for one or more memory devices. An advantage over connections characterized in accordance with various common communication protocols includes reduction in delay attributable to signaling between devices in accordance with protocol specifications.

In a configuration, multiple memory devices may be individually accessed by a memory controller. Accordingly, an individually accessed memory device may be subjected to a smaller capacitive load compared to that of accessing multiple memory devices in a parallel configuration. In one implementation, a memory controller may select or access an individual memory device while bypassing unselected memory devices. In this context, bypassing unselected memory devices is intended to mean that the unselected memory devices are electrically isolated from a memory controller. In detail, a selected memory device may comprise a memory array that is accessed by a memory controller via a bidirectional interconnection, whereas unselected memory devices may comprise memory arrays that are electronically removed from the bidirectional interconnection or the memory controller. In this context, being removed from a bidirectional interconnection, again, is intended to refer to the unselected memory devices being electrically isolated. For example, using one or more switches, connection via a bidirectional interconnection between a memory controller and a selected memory array may comprise an electrical short circuit connection while connection between the memory controller and unselected memory arrays may comprise an electrical open circuit connection. Details of embodiments of switches are discussed below, although these details are merely examples, and claimed subject matter is not so limited.

A memory system may comprise multiple memory devices that include a memory array, a frontside bidirectional interconnection interface, or a backside bidirectional interconnection interface. "Frontside" refers to a side of a memory device that is electrically closer, e.g., in terms of impedance, to a memory controller, whereas "backside" refers to a side of the memory device that is electrically further from, e.g., in terms of impedance, the memory controller. For example, a memory controller may be connected to a memory device via a bidirectional connection to a frontside bidirectional interface. For example, a memory device may be connected to a second memory device via a bidirectional connection to a backside bidirectional interface of a first memory device and a frontside bidirectional interface of a second memory device, for example. Additional memory devices may be similarly interconnected. In an interconnection for an embodiment, for example, electrical communication between a second memory device and a memory controller may transmit through a first memory device. For example, electrical communication between a third memory device and a memory controller may transmit through a first memory device and a second memory device, and so on.

Individual memory devices of a memory system may include a switch to connect a memory controller to a memory array of a selected memory device or to disconnect a memory controller from memory arrays of unselected memory devices. Memory device switches may be responsive to a signal generated or transmitted by a memory controller during a process of selecting a particular memory device. In addition to opening or closing electrical connections between a memory controller and memory devices, in at least one embodiment, memory device switches may be capable of buffering signals representing memory addresses, information read from or to be written to memory, or command signals transmitted between a memory controller and a selected memory device. In one particular implementation, memory device switches may be disposed on the same dies or semiconductor chips as that of memory arrays. However, claimed subject matter is not to these or to any particular embodiments.

In an embodiment, a method of operating a memory system, for example, may involve a memory controller generating a signal to select a particular memory device among two or more memory devices that may be interconnected with one another in a chain topology. A signal, for example, may be used to operate switches located on one or more dies also including a memory device, although claimed subject matter is not necessarily limited in this manner. In one implementation, a signal may comprise a multibit digital signal, such as an address, for example, representing a particular memory device. A memory controller may transmit a signal to a selected memory device via multiple output pins of a memory controller. In another implementation, however, a memory controller may transmit a signal to a selected memory device via a single output pin of the memory controller.

A memory device, upon or after receiving a signal from a memory controller, may determine if the memory device is selected or not selected based, at least in part, on a particular signal. For example, in the case of an embodiment employing a multibit signal, a memory device may be selected if a signal comprises an address that identifies a particular memory device. In another example, in the case of an embodiment employing a single-bit signal, a memory device may be selected if the memory device receives the signal, whereas unselected memory devices may not receive the signal. In an implementation, a memory device may operate an on-board switch in response to being selected or not being selected. For example, a selected memory device may include a switch that electrically connects a memory array of the selected memory device to a bidirectional interface connected to a memory controller. On the other hand, an unselected memory device may include a switch that electrically disconnects a memory array of the unselected memory device from a bidirectional interface connected to a memory controller. Of course, these details of a memory device are merely examples, and claimed subject matter is not so limited.

Figure 1:
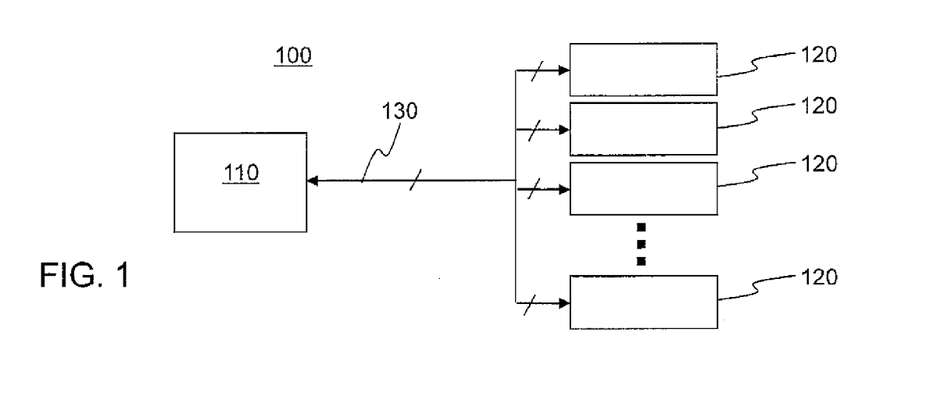
FIG. 1 is a schematic diagram of an embodiment of a memory system.

FIG. 1 is a schematic diagram of an embodiment 100 of a memory system. A processor executing an application, for example, may issue commands to memory controller 110, for example. Commands may comprise instructions to read from or write to any or all of a plurality of n memory devices 120, or portions thereof, controlled or operated by memory controller 110, wherein n is an integer. In particular, instructions may include a memory address or information to be written to memory device locations. Instructions or other information may be carried between memory controller 110 and memory devices 120 via bus 130, which may comprise a plurality of electrically parallel conductors, for example. Bus 130 may connect in parallel to individual memory devices 120, which may comprise individual chips or dies. For example, memory devices 120 may be arranged in a stacked configuration in a semiconductor package.

A bus configuration that connects in parallel to a plurality of memory devices may lead to a cumulative bus capacitance that may increase as the number of memory devices in memory system 100 increases. As discussed above, cumulative bus capacitance may be an undesirable feature that may adversely affect memory system performance. For example, increasing the number of memory devices in a memory system may lead to increased cumulative bus capacitance, resulting in decreased operating speed of a memory system, for example. Thus, a memory device 120 sharing bus 130 with other memory devices 120 may drive signals on a bus at a reduced speed due at least in part to capacitive loading.

Figure 2:
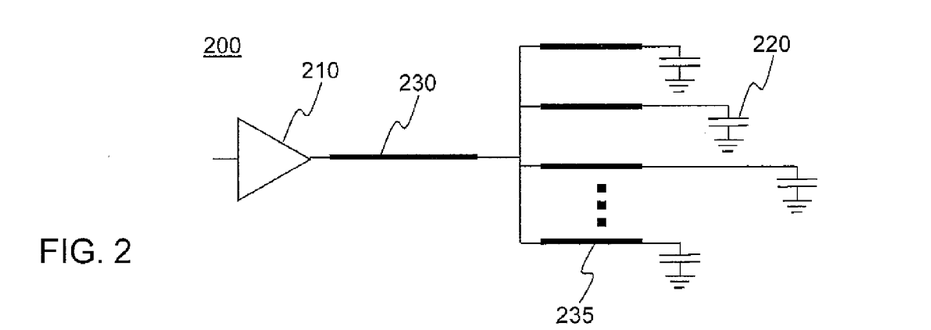
FIG. 2 depicts an electrical model of an embodiment of a memory system.

FIG. 2 depicts an electrical model 200 of memory system 100 shown in FIG. 1. Memory controller 110 may be represented by a driver 210, bus 130 may be represented by transmission line 230 or 235, and memory devices 120 may be represented by a capacitive load 220 to ground. This electrical model shows that adding memory devices 120 in parallel to bus 130 may result in accumulated or cumulative capacitance, since parallel capacitive loads 220 may be additive.

Figure 3:
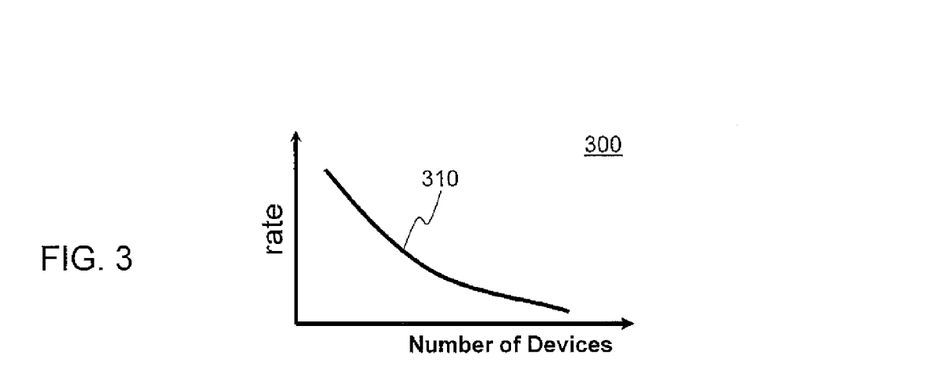
FIG. 3 is a plot of operating rate versus number of memory devices for an embodiment of a memory system.

FIG. 3 is a "stylized" plot 300 of operating rate versus number of memory devices of an embodiment of a memory system. As discussed above, as the number of parallel memory devices increases, operating rate or performance may decrease, which is shown by curve 310, for example. Thus, increasing a number of memory devices, whether or not resulting in increased memory density, of a memory system using a parallel configuration of individual memory devices may result in an undesirable decrease in memory system speed.

Figure 4:
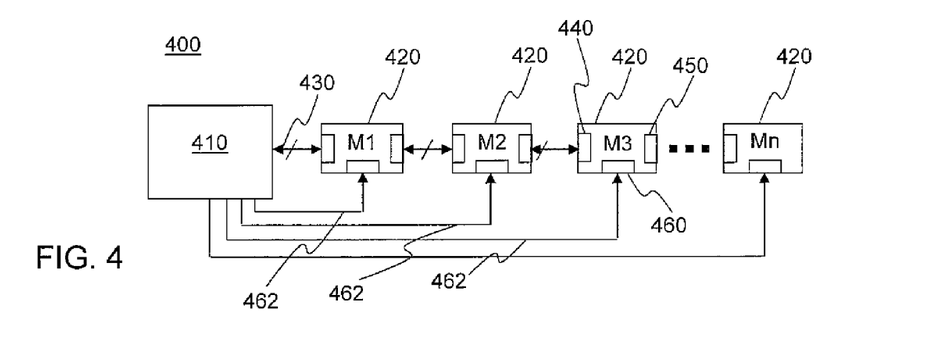
FIG. 4 is a schematic diagram of another embodiment of a memory system.

FIG. 4 is a schematic diagram of an embodiment of a memory system 400. In particular, memory system 400 may involve a bidirectional interconnection that is different from a bus configuration. For example, memory devices 420 may be connected to memory controller 410 or one another in a chain topology using serial bidirectional interconnections. Memory devices 420 may be structurally or functionally similar; however, this is not required. Further, individual memory devices 420 may occupy different placements in a chain topology. For example, memory device 420 electrically closest (e.g., in terms of impedance) to memory controller 410 may be called "M1". Other memory devices 420 may be identified by position in a chain topology as M2, M3, and so on to $M_n$, wherein n is an integer, as shown in FIG. 4.

Portions of bidirectional interconnection 430 may be selectively interconnected by switches 460 disposed in individual memory devices 420, as explained in detail below and shown in FIG. 6. For example, a switch disposed in memory device 420 may connect a portion of bidirectional interconnection 430 on one side of memory device 420 to a portion of bidirectional interconnection 430 on another side of memory device 420. For a particular example, a switch disposed in M2 may connect M1 to M3 by connecting a portion of bidirectional interconnection 430 between M1 and M2 to a portion of a bidirectional interconnection between M2 and M3. On the other hand, a switch may disconnect a portion of bidirectional interconnection 430 on one side of memory device 420 from a portion of bidirectional interconnection 430 on the other side of memory device 420. Memory device 420 may comprise a frontside bidirectional interconnection interface 440 or a backside bidirectional interconnection interface 450 to which portions of bidirectional interconnection 430 may connect. Switches 460 may be responsive to signals transmitted by memory controller 410 via lines 462 that are individually connected to individual memory devices 420. Using lines 462, memory controller 410 may select a particular memory device 420 among multiple memory devices by operating switches 460 of the memory devices to electrically bypass devices in a chain topology other than a selected memory device, as described in detail below.

In a particular embodiment, memory controller 410 may select a particular memory device 420 for subsequent access by asserting a signal on a particular line 462 corresponding to a selected memory device. Receiving a signal, switch 460 of a selected memory device may electrically connect a memory array of the selected memory device to bidirectional interconnection 430 for subsequent access by memory controller 410. Meanwhile, switches 460 other than the switch 460 of the selected memory device may electrically disconnect (or maintain a disconnected state of) memory arrays of unselected memory devices from bidirectional interconnection 430. In this fashion, a memory controller, a selected memory device, or a bidirectional interface that may connect a memory controller and a selected memory device may be electrically isolated from a remaining plurality of unselected memory devices (e.g., open circuit), thereby reducing capacitive loading.

To illustrate by a particular example, memory controller 410 may select memory device M2 by asserting a signal on line 462 corresponding to M2. Receiving a signal, switch 460 of selected M2 may permit memory controller 410 to have subsequent access to a memory array of M2 via bidirectional interconnection 430. Meanwhile, switches 460 of memory devices M1, M3, ... $M_n$ other than selected M2 may electrically disconnect (or maintain a disconnected state of) memory arrays of M1, M3, ... $M_n$ from bidirectional interconnection 430. In one implementation, switches 460 of intervening memory devices disposed between memory controller 410 and a selected memory device may operate to electrically disconnect memory arrays of intervening memory devices. Meanwhile, switches 460 may interconnect portions of bidirectional interconnection 430 between memory controller 410 and a selected memory device. In other words, switches of unselected memory devices may interconnect portions of bidirectional interconnection 430 while bypassing memory arrays of unselected memory devices. For example, as previously described, unselected memory devices may be electrically isolated. On the other hand, switch 460 of a memory device immediately adjacent to a selected memory device and disposed further from memory controller 410 than the selected memory device along a chain topology may operate to electrically remove memory arrays or bidirectional interconnection portions that are at or beyond an immediately adjacent memory device. Thus, continuing with the example above, switch 460 of intervening M1 may operate to electrically disconnect the memory array of M1.

Meanwhile, switch 460 may interconnect portions of bidirectional interconnection 430 between memory controller 410 and selected M2. On the other hand, switch 460 of adjacent M3 may operate to electrically remove memory arrays or bidirectional interconnection portions of M3 through $M_n$.

Figure 5:
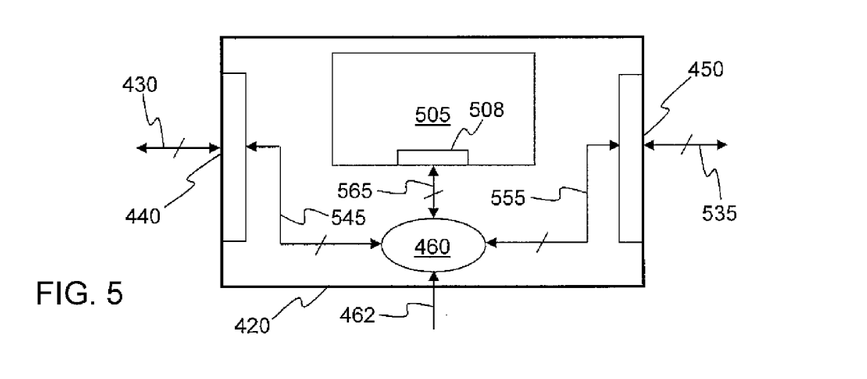
FIG. 5 is a schematic diagram of the embodiment of FIG. 4 shown in more detail.

FIG. 5 is a schematic diagram of an embodiment of a memory device 420. Memory device 420 may include switch 460 to connect frontside bidirectional interconnection interface 440 to backside bidirectional interconnection interface 450, thus connecting bidirectional interconnection portion 430 to bidirectional interconnection portion 535. Optionally, switch 460 may connect frontside bidirectional interconnection interface 440 or backside bidirectional interconnection interface 450 to memory array 505 via bidirectional interconnection portion 565. Memory array 505 may include command or address decoding component(s), read or write buffer component(s), or other components for writing to or reading from memory array 505, for example. Accordingly, switch 460 may selectively connect memory array 505 to memory controller 410 via bidirectional interconnection 430. On the other hand, switch 460 may selectively disconnect memory array 505 from the memory controller.

The term "bypassing a memory array" refers to a process of electrically disconnecting a memory array from a bidirectional interconnection or memory controller of a memory system. As a result, capacitive loading that might otherwise be attributable to the memory array does not occur, as desired. Bidirectional interconnection 545 may comprise an interconnection disposed in memory device 420 to carry signals between frontside bidirectional interface 440 and switch 460. Similarly, bidirectional interconnection 555 may comprise an interconnection disposed in memory device 420 to carry signals between backside bidirectional interface 450 and switch 460.

As mentioned above, switch 460 may be responsive to a signal generated or transmitted via line 462 by memory controller 410. In one implementation, line 462 may comprise a single conducting line that electrically connects a single output pin of memory controller 410 to switch 460. A single conducting line 462 may carry a bypass signal represented by an electrical signal comprising signals at different voltage levels representing different logic states (e.g., "1" or "0"), for example. Memory controller 410 may operate switch 460 by providing switch 460 with a bypass signal. In another implementation, which will be discussed in further detail below, multiple lines (see lines 765 in FIG. 7, for example) may electrically connect multiple output pins of memory controller 410 to switch 460. Multiple lines may carry a bypass signal comprising a multi-bit digital electronic signal, for example; although, claimed subject matter is not limited in scope in this respect.

Memory array 505 may comprise a plurality of NAND or NOR flash memory cells, SRAM or DRAM memory cells, or phase-change memory cells, just to name a few examples. Memory cells may be arranged in one or more arrays, blocks, sectors, or pages, for example. Memory array 505 may include peripheral electronics 508 to perform read or write accesses to memory array 505, for example. Peripheral electronics may comprise memory address decoders, sense amplifiers, power supplies, or inverters, just to name a few examples. Memory controller 410 may program memory cells of memory array 505 in a process that includes transmitting program information over bidirectional interconnection 430 to memory array 505 via switch 460, for example. Program information may comprise, for example, signals representing information to be written to particular memory cells or signals representing memory cell addresses designating memory locations to where information is to be written. Also, memory controller 410 may read memory cells of memory array 505 in a process that includes transmitting signals that represent addresses of particular memory cells of memory array 505 over bidirectional interconnection 430 via switch 460, for example. Signals representing information stored in particular memory cells may be subsequently received via bidirectional interconnection 430 by memory controller 410.

In addition to opening or closing electrical connections between a memory controller and memory devices, in at least one embodiment, switch 460 may be capable of buffering signals, such as those representing addresses of memory cells or information to be written to or read from memory cells, for example. A process of buffering signals may also comprise amplifying signals, for example. In another implementation, switch 460 may comprise a switchable voltage-follower transistor configuration, wherein magnitudes of voltages or currents of signals may be amplified by unity gain, for example. In still another implementation, switch 460 may comprise a micro-electro-mechanical (MEM) switch. Of course, claimed subject matter is not limited to any of these example implementations.

Figure 6:
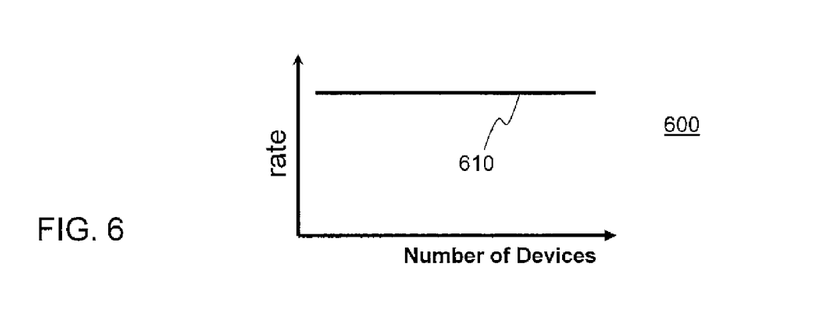
FIG. 6 is a plot of operating rate versus number of memory devices for another embodiment of a memory system.

FIG. 6 is a plot 600 of operating rate versus number of memory devices of an embodiment of a memory system. For example, plot 600 may represent memory system 400, shown in FIG. 4. As is illustrated, as the number of memory devices increases, operating rate of memory system 400 may not be significantly degraded, as shown by curve 610, for example. Thus, increasing memory capacity through additional chips or dies of memory system 400 using serial bidirectional interconnections in a chain topology configuration of individual memory devices need not result in a significant undesirable decrease in memory system speed. In contrast, as discussed above and shown in FIG. 3, for example, as the number of parallel memory devices increases in a memory system, such as 100, operating rate may decrease due at least in part to a cumulative capacitive load, as previously discussed.

Figure 7:
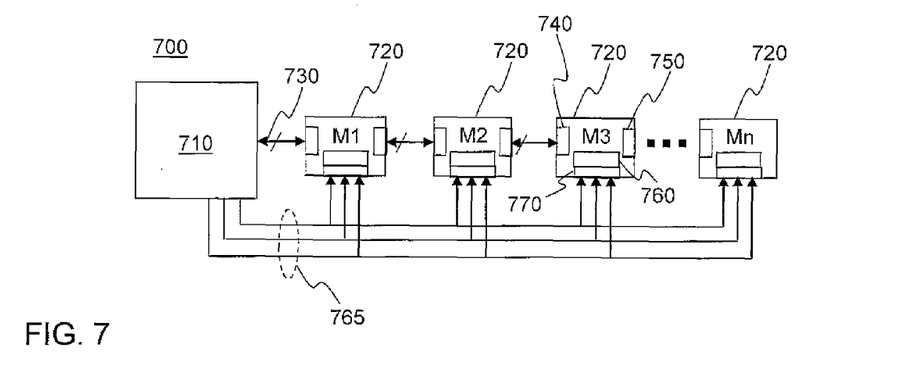
FIG. 7 is a schematic diagram of yet another embodiment of a memory system.

FIG. 7 is a schematic diagram of another embodiment 700 of a memory system. Memory system 700 may be similar to memory system 400 shown in FIG. 4. However, as one difference, for example, multiple signal lines 765 may be used instead of single line 462. In particular, memory system 700 may involve a bidirectional interconnection configuration similar to that of memory system 400. For example, memory devices 720 may be connected to memory controller 710 or one another in a chain topology using serial bidirectional interconnections. Memory devices 720 may be structurally or functionally similar to one another. However, this is not required. Further, individual memory devices 720 may occupy different placements in a chain topology. For example, memory device 720, illustrated as electrically closest (e.g., in terms of impedance) to memory controller 710 may be called "MD1". Other memory devices 720 may be identified by position in a chain topology as MD2, MD3, and so on to $M_n$, wherein n is an integer, as shown in FIG. 7.

Portions of bidirectional interconnection 730 may be selectively interconnected by switches 760 disposed in individual memory devices 720. For example, a switch disposed in a memory device 720 may connect a portion of bidirectional interconnection 730 on one side of memory device 720 to a portion of bidirectional interconnection 730 on another side of memory device 720. On the other hand, a switch may disconnect a portion of bidirectional interconnection 730 on one side of memory device 720 from a portion of bidirectional interconnection 730 on another side of memory device 720. Memory device 720 may comprise a frontside bidirectional interconnection interface 740 or a backside bidirectional interconnection interface 750 to which portions of bidirectional interconnection 730 may connect.

Switches 760 may be responsive to signals transmitted by memory controller 710 via lines 765 that may be connected to individual memory devices 720. Lines 765 may electrically connect multiple output pins of memory controller 710 to switch 760. Lines 765 may carry a signal comprising a multi-bit digital electronic signal, for example. Using lines 765, memory controller 710 may select a particular memory device 720 among multiple memory devices by operating or controlling switches 760 or bypass circuitry of memory devices to electrically bypass unselected memory devices. In one implementation, individual memory devices 720 may be assigned an address or other identifier to distinguish memory devices 720 from one another. Switches 760 may include an address decoder 770, for example, to receive multi-bit signals from memory controller 710 via lines 765. A processor, such as processing unit 1020 (FIG. 10), for example, may execute one or more applications to generate multi-bit signals. Though multiple memory devices 720 may concurrently receive a particular multi-bit signal from memory controller 710, a multi-bit signal may comprise an address to identify a particular memory device among multiple memory devices. For example, lines 765 may comprise more than one conductor, such as parallel conductors, for example, to carry three memory device address bits from three output pins of memory controller 710 to address decoders 770 at individual memory devices 720. Address decoders, upon or after receiving a three-bit address, may decode the three-bit address to determine a particular memory device selected by the memory controller identified by the three-bit address. In the example of lines 765 comprising three conductors, embodiment 700 may include eight memory devices 720 (e.g., $n=2^3$ or 8), though claimed subject matter is not limited to any particular number n. This is merely a possible example.

In a particular embodiment, memory controller 710 may select a particular memory device 720 for subsequent access by asserting a particular multi-bit signal over or via line(s) 765 corresponding to an assigned address of a selected memory device. Receiving a multi-bit signal, switch 760 of a selected memory device may electrically connect a memory array of a selected memory device to bidirectional interconnection 730 for subsequent access by memory controller 710. Meanwhile, switches 760 of memory devices other than a selected memory device may electrically disconnect (or maintain a disconnected state of) memory arrays of unselected memory devices from bidirectional interconnection 730. Thus, a memory controller, a selected memory device, or a bidirectional interconnection that may connect a memory controller and a selected memory device may be electrically isolated from a remaining plurality of unselected memory devices.

To illustrate by a particular example, memory controller 710 may select memory device M3 by asserting a multi-bit signal over or via line(s) 765 corresponding to an address associated with M3. Receiving a signal, switch 760 of selected M3 may electrically connect a memory array of M3 to bidirectional interconnection 730 for subsequent access by memory controller 710. Meanwhile, switches 760 of memory devices M1, M2, M4, . . . $M_n$ other than selected M3 may electrically disconnect (or maintain a disconnected state of) memory arrays of M1, M2, M4, . . . $M_n$ from bidirectional interconnection 730. In one implementation, switches 760 of intervening memory devices disposed between memory controller 710 and a selected memory device may operate to electrically disconnect memory arrays of intervening memory devices. Meanwhile, switches 760 may interconnect portions of bidirectional interconnection 730 between memory controller 710 and a selected memory device. In other words, switches of unselected memory devices may interconnect portions of bidirectional interconnection 730 while bypassing memory arrays of unselected memory devices. On the other hand, switch 760 of a memory device immediately adjacent to a selected memory device and disposed further from memory controller 710 (e.g., in terms of impedance) than a selected memory device may operate to electrically remove memory arrays or bidirectional interconnection portions that are at or beyond the immediately adjacent memory device. Thus, continuing with the example above, switches 760 of intervening M1 and M2 may operate to electrically disconnect memory arrays of M1 or M2. Meanwhile, switch 760 may interconnect portions of bidirectional interconnection 730 between memory controller 710 and selected M3. On the other hand, switch 760 of immediately adjacent M4 may operate to electrically remove memory arrays or bidirectional interconnection portions of M4 through $M_n$.

Figure 8:
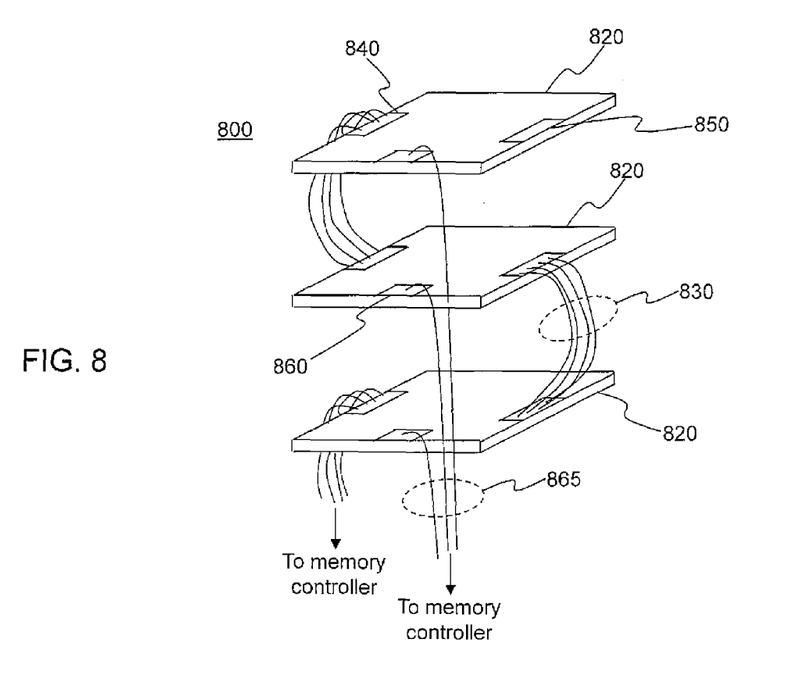
FIG. 8 is a perspective view of still another embodiment of a memory system.

FIG. 8 is a perspective view of a memory module 800, according to an embodiment. Memory module 800 may incorporate a chain topology using serial bidirectional interconnections, such as that shown in FIG. 4 or 7, for example. Memory module 800 may comprise two or more memory devices 820 interconnected by bidirectional interconnection portion 830, for example. In detail, bidirectional interconnection portion 830 may connect a frontside bidirectional interconnection interface 840 of one memory device to a backside bidirectional interconnection interface 850 of an immediately adjacent memory device. Bidirectional interconnection portion 830 may comprise any number of conducting lines to carry signal information between memory devices 820 and a memory controller. For example, bidirectional interconnection portion 830 may comprise sixteen, thirty-two, or sixty-four lines, just to name a few examples. Individual memory devices 820 may include a switch 860 responsive to signals carried via lines 865. In one implementation, the number of lines 865 may be equal to the number of memory devices 820 in contrast to use of a decoder, as described previously, for example, since individual lines 865 may connect to individual memory devices, though claimed subject matter is not so limited. Though three memory devices 820 are shown in FIG. 3, any number of memory devices may be arranged in any configurations, such as a stacked configuration. Memory module 800 may comprise tens or hundreds of memory devices, though claimed subject matter is not so limited. Memory devices 820 may comprise a memory die or single memory chip, for example.

Figure 9:
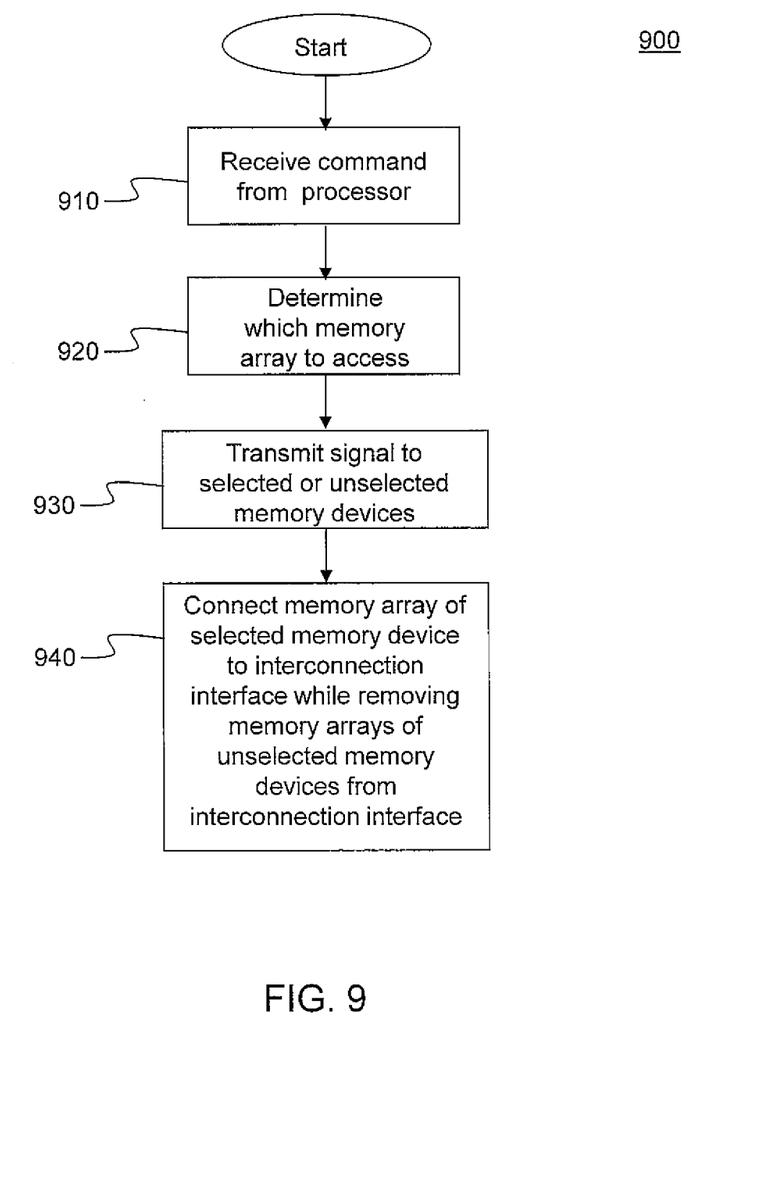
FIG. 9 is a flow diagram of an embodiment of a process to operate a memory device.

FIG. 9 is a flow diagram of an embodiment of a process 900 to operate a memory device. A memory device may comprise a portion of a memory module that includes two or more memory devices or a memory controller, which may be individually disposed on individual dies, though claimed subject matter is not so limited. For example, a memory device or memory controller may be similar to that shown in FIG. 4 or 7. At block 910, a processor may issue a command to a memory controller. A command may comprise, as example, read, write, or erase instruction(s), including one or more memory addresses of memory locations where instructions of a command are to be performed, for example. At block 920, a memory controller may determine or select a particular memory device to access based, at least in part, on a memory address provided with a command. At block 930, a memory controller may transmit one or more signals to memory devices. For example, referring to FIG. 4, memory controller 410 may transmit a signal over a particular line 462 so as to select memory device M2 from among available memory devices. In another example, referring to FIG. 7, memory controller 710 may transmit a signal to memory devices M1 through $M_n$, wherein the signal particularly identifies a selected memory device M2 from among available memory devices. Accordingly, at block 940, in response to receiving a signal, a switch of a selected memory device may connect a memory array of the selected memory device to a bidirectional interconnection interface and thereby to a controller, while remaining memory devices, which may be unselected, are disconnected from the bidirectional interconnection interface. Of course, these details of process 900 are merely examples, and claimed subject matter is not so limited.

Figure 10:
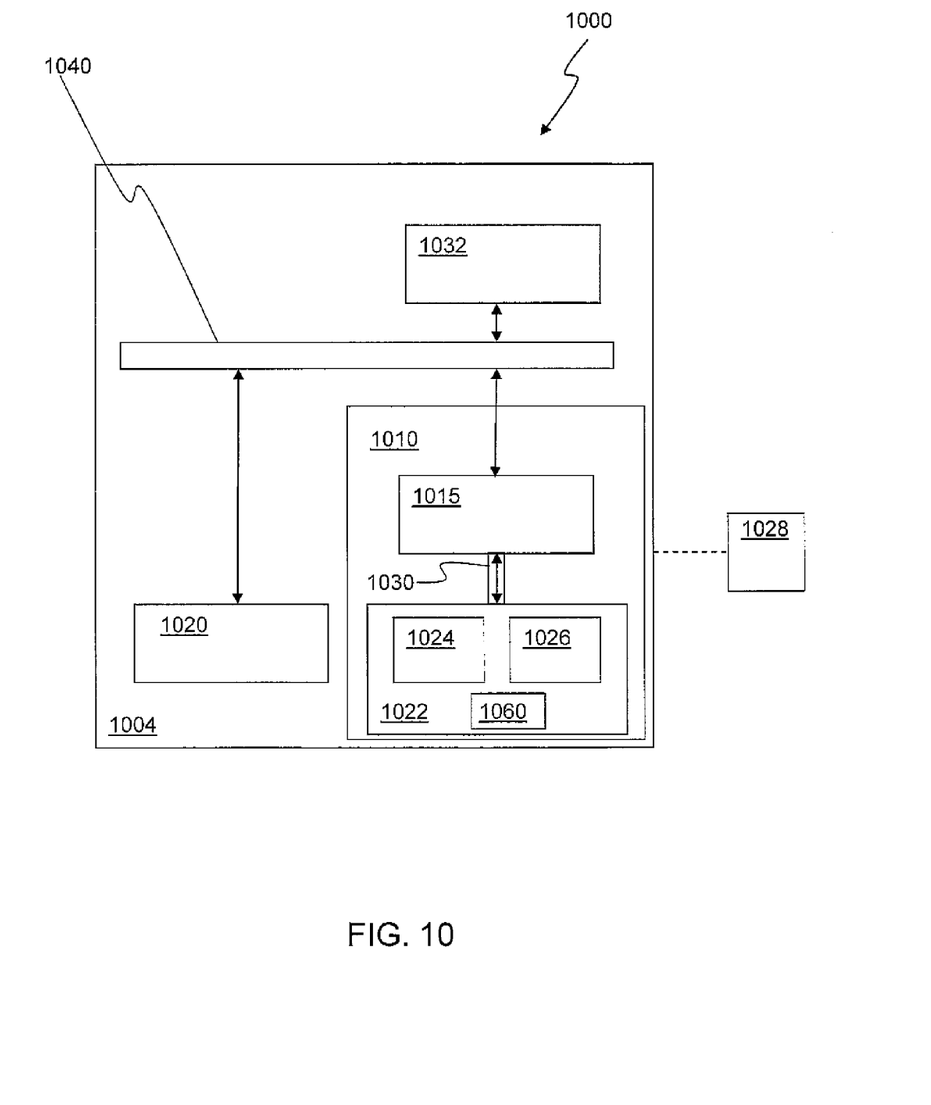
FIG. 10 is a schematic diagram illustrating an embodiment of a computing system.

FIG. 10 is a schematic diagram illustrating an embodiment of a computing system 1000 including a memory module 1010, which may comprise a multi-chip memory module including memory devices that are interconnected with one another in a chain topology, for example. In one implementation, a memory device may comprise a multi-chip package using die-to-die bonding among two or more memory dies, though claimed subject matter is not so limited. A computing device may comprise one or more processors, for example, to execute an application or other code. A computing device 1004 may be representative of any device, appliance, or machine that may be employed to manage memory module 1010. Memory module 1010 may include a memory controller 1015 and a memory 1022. By way of example but not limitation, computing device 1004 may include: one or more computing devices or platforms, such as, e.g., a desktop computer, a laptop computer, a workstation, a server device, or the like; one or more personal computing or communication devices or appliances, such as, e.g., a personal digital assistant, mobile communication device, or the like; a computing system or associated service provider capability, such as, e.g., a database or information storage service provider or system; or any combination thereof.

It is recognized that all or part of various devices shown in system 1000, and processes or methods as farther described herein, may be implemented using or otherwise including at least one of hardware, firmware, software or any combination thereof (other than software by itself). Thus, by way of example, but not limitation, computing device 1004 may include at least one processing unit 1020 that is operatively coupled to memory 1022 through a bus 1040 and a host or memory controller 1015. Processing unit 1020 is representative of one or more devices capable of performing at least a portion of a computing procedure or process. By way of example, but not limitation, processing unit 1020 may include one or more processors, memory controllers, microprocessors, application specific integrated circuits, digital signal processors, programmable logic devices, field programmable gate arrays, the like, or any combination thereof. Processing unit 1020 may include an operating system to be executed that is capable of communication with memory controller 1015. An operating system may, for example, generate commands to be sent to memory controller 1015 over or via bus 1040. Commands may comprise read or write commands, for example. In response to a read command, for example, memory controller 1015 may perform process 900 described above, to select a memory army of a memory device.

Memory 1022 is representative of any information storage mechanism. Memory 1022 may include, for example, a primary memory 1024 or a secondary memory 1026. Primary memory 1024 may include volatile or nonvolatile memory, such as, for example, random access memory, read only memory, etc. While illustrated in this example as being separate from processing unit 1020, it should be understood that all or part of primary memory 1024 may be provided within or otherwise co-located/coupled with processing unit 1020.

Secondary memory 1026 may include, for example, the same or similar type of memory as primary memory or one or more other types of information storage devices or systems, such as, for example, a disk drive, an optical disc drive, a tape drive, a solid state memory drive, etc. In certain implementations, secondary memory 1026 may be operatively receptive of, or otherwise capable of being operatively coupled to a computer-readable medium 1028. Computer-readable medium 1028 may include, for example, any medium that is able to store, carry or make accessible readable, writable, or rewritable information, code, or instructions for one or more of device in system 1000. Computing device 1004 may include, for example, an input/output device or unit 1032.

In a particular embodiment, computing system 1000 may include memory module 1010 comprising one or more memory devices 1022, memory controller 1015, or a switch 1060 to interconnect buses 1030 connected between two or more memory devices and memory controller 1015, wherein switch 1060 is responsive to a signal generated by the memory controller, and wherein the switch is located on a same die as one of the memory devices. Computing system 1000 may also include processing unit 1020 to host one or more applications or operating systems or to initiate read commands directed to memory controller 1015 to provide access to memory cells in memory 1024, for example.

Input/output unit or device 1032 is representative of one or more devices or features that may be capable of accepting or otherwise receiving signal inputs from a human or a machine, or one or more devices or features that may be capable of delivering or otherwise providing signal outputs to be received by a human or a machine. By way of example but not limitation, input/output device 1032 may include a display, speaker, keyboard, mouse, trackball, touch screen, etc.

It will, of course, be understood that, although particular embodiments have just been described, claimed subject matter is not limited in scope to a particular embodiment or implementation. For example, one embodiment may be in hardware, such as implemented on a device or combination of devices, for example. Likewise, although claimed subject matter is not limited in scope in this respect, one embodiment may comprise one or more articles, such as a storage medium or storage media that may have stored thereon instructions capable of being executed by a specific or special purpose system or apparatus, for example, to result in performance of an embodiment of a method in accordance with claimed subject matter, such as one of the embodiments previously described, for example. However, claimed subject matter is, of course, not limited to one of the embodiments described necessarily. Furthermore, a specific or special purpose computing platform may include one or more processing units or processors, one or more input/output devices, such as a display, a keyboard or a mouse, or one or more memories, such as static random access memory, dynamic random access memory, flash memory, or a hard drive, although, again, claimed subject matter is not limited in scope to this example.

In the preceding description, various aspects of claimed subject matter have been described. For purposes of explanation, specific numbers, systems, or configurations may have been set forth to provide a thorough understanding of claimed subject matter. However, it should be apparent to one skilled in the art having the benefit of this disclosure that claimed subject matter may be practiced without those specific details. In other instances, features that would be understood by one of ordinary skill were omitted or simplified so as not to obscure claimed subject matter. While certain features have been illustrated or described herein, many modifications, substitutions, changes, or equivalents may now occur to those skilled in the art. It is, therefore, to be understood that the appended claims are intended to cover all such modifications or changes as fall within the true spirit of claimed subject matter.

What is claimed is:

1. A memory device comprising:
   a memory array;
   a first port to interface with a memory controller indirectly via another memory device;
   a second port to interface with yet another memory device; and
   a switch to directly interface with the memory controller and to selectively electrically connect the memory controller to a circuit path, wherein the circuit path may comprise a path to the second port or a path to the memory array, and wherein the switch is responsive to a signal generated by the memory controller.

2. The memory device of claim 1, wherein the switch is capable of buffering signals representing addresses or information to be stored at memory locations corresponding to the addresses transmitted from the memory controller to the yet another memory device.

3. The memory device of claim 1, wherein the switch is disposed on a same semiconductor die as that of the memory array.

4. A method of operating a memory device, wherein the memory device is included in a memory configuration comprising multiple memory devices and a memory controller, the method comprising:
   switching a communication path to connect a memory controller to a memory array of the memory device or to a bidirectional interconnection interface of the memory device using a switch within the multiple memory devices, the switch directly interface with the memory controller, wherein the switching is based, at least in part, on a signal received from the memory controller, and wherein the bidirectional interconnection interface is connected to another memory device via a chain topology;
   wherein at least one of the multiple memory devices is configured to connect with the memory controller indirectly via another memory die.

5. The method of claim 4, further comprising:
   receiving read or write signals via the communication path and receiving the signal from the memory controller via conducting lines.

6. The method of claim 4, wherein the signal comprises a multibit digital signal designating the memory array.

7. A system comprising:
   a memory device comprising a memory controller and two or more memory dies, wherein individual ones of the memory dies include:
   a memory array;
   a first bidirectional interconnection interface;
   a second bidirectional interconnection interface; and
   a switch to communicatively connect the memory array to the first bidirectional interconnection interface or to communicatively isolate the memory array from the first bidirectional interconnection interface and the second bidirectional interconnection interface;
   wherein the memory controller is configured to generate a signal to select a particular memory die among the two or more memory dies wherein the signal is used to operate the switches located on the two or more memory dies; and a process to host one or more applications and to initiate programming the memory arrays located on the two or more memory dies;

wherein each switch directly interfaces with the memory controller; and wherein the first bidirectional port of at least one of the two or more memory dies is configured to interface with the memory controller indirectly via another memory die.

8. The system of claim 7, wherein the two or more memory dies are interconnected to one another in a chain topology.

9. The system of claim 7, wherein the switch comprises a micro-electro-mechanical (MEM) switch.

10. The system of claim 7, wherein the memory device comprises a multi-chip package using die-to-die bonding among the two or more memory dies.

11. The system of claim 10, wherein the multi-chip package comprises a stacked configuration.

12. The system of claim 7, wherein the switch is capable of buffering signals from the memory controller representing memory addresses or information read from memory locations corresponding to the memory addresses.

13. The system of claim 7, wherein the memory arrays comprise nonvolatile memory arrays.

* * * * *